United States Patent [19]
Wnuk et al.

[11] Patent Number: 5,384,440
[45] Date of Patent: Jan. 24, 1995

[54] AUTOMOTIVE SEAT SWITCH ASSEMBLY

[75] Inventors: Joseph Wnuk, Westland; Lawrence T. Wargo, Clinton Township, Macomb County, both of Mich.

[73] Assignee: United Technologies Automotive, Inc., Dearborn, Mich.

[21] Appl. No.: 991,783

[22] Filed: Dec. 17, 1992

[51] Int. Cl.6 ............................................. H01H 9/00
[52] U.S. Cl. ...................................... 200/5 R; 200/18; 200/317
[58] Field of Search ............ 200/5 R, 5 A, 6 R, 17 R, 200/18, 52 R, 310–317

[56]  References Cited
U.S. PATENT DOCUMENTS

| | | | |
|---|---|---|---|
| 3,135,839 | 6/1964 | Colautti et al. | 200/5 |
| 4,255,780 | 3/1981 | Sakellaris | 362/32 |
| 4,669,780 | 6/1987 | Sakakibara et al. | 297/257 |
| 4,851,624 | 7/1989 | Chestnut et al. | 200/317 |
| 4,903,318 | 2/1990 | Nagata | 388/840 |
| 5,047,596 | 9/1991 | Ebishi | 200/4 |
| 5,243,156 | 9/1993 | Shirasaka | 200/5 R |

Primary Examiner—A. D. Pellinen
Assistant Examiner—Michael A. Friedhofer
Attorney, Agent, or Firm—Ronald G. Cummings

[57] ABSTRACT

An automotive seat switch assembly for controlling seat movement comprising a switch housing having front and back covers and a middle switch plate, where the middle switch plate has a plurality of conductors molded in and a plurality of conductor contact surfaces on its outer surface, and a plurality of switch actuator assemblies, where each actuator assembly comprises a contactor for electrically contacting a respective one of the contact surfaces, a contactor actuator slidably mounted to a rail for slidingly actuating the contactor, and a pari of spaced apart support posts extending from the housing upon which the rails are mounted, where the front cover encloses the switch actuator assemblies.

15 Claims, 3 Drawing Sheets

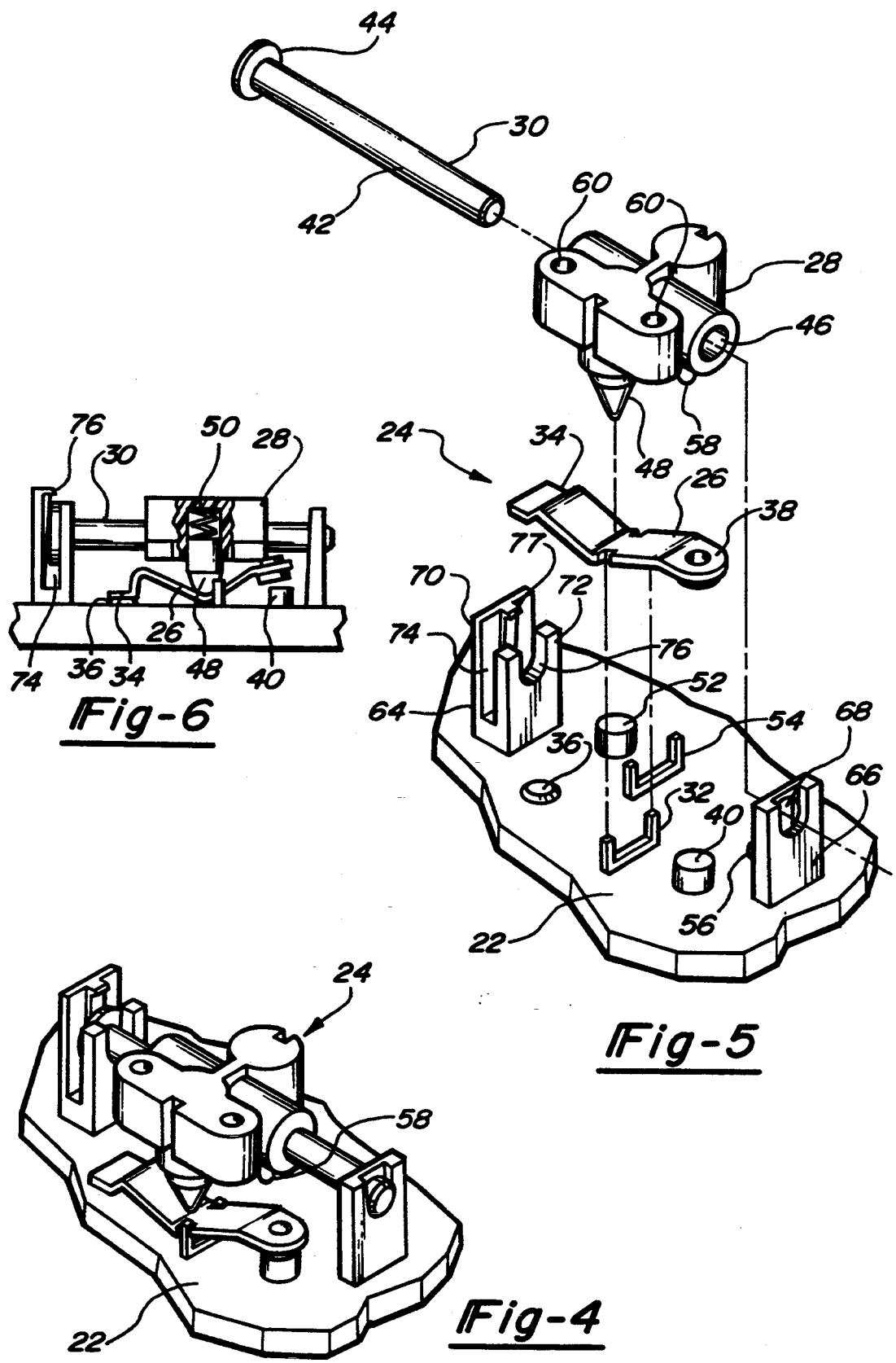

AUTOMOTIVE SEAT SWITCH ASSEMBLY

TECHNICAL FIELD

This invention relates to automotive switch assemblies and more particularly to a seat switch for controlling the electric motors which adjust seat position in vehicle interiors.

BACKGROUND AND SUMMARY OF THE INVENTION

In automotive power seats, fractional horsepower DC electric motors are utilized to achieve seat position adjustment in vehicle interiors. Typically, four degrees of seat adjustment are provided, namely (1) forward-aft seat position, (2) vertical height of the forward portion of the sear bench, (3) vertical height of the rearward portion of the seat bench, and (4) angular position (i.e., tilt) of the seat back.

A known seat switch design utilizes two knobs which control four switch actuators in the switch assembly. The knobs are formed in the general shape of a seat back and a seat bench for ease of use in operating the switch. The seat back shaped knob controls one switch actuator and the seat bench shaped knob controls three switch actuators for the desired four degrees of adjustment.

The seat switch has a subassembly of conductive strips or bus bars which are selectively interconnected by the switch actuators to provide power to the respective positioning motors. The buses are connected to a wire assembly having a terminal which connects to a wire harness in the vehicle to interconnect the seat switch to the positioning motors. The subassembly of buses has heretofore been fabricated of layers of conductors separated by insulating sheets mounted together within the switch housing prior to assembly of the switch actuators. The multilayer construction and fabrication of the buses and separating sheets required a large size switch housing. It is desirable to reduce the size of the switch housing, particularly the thickness of the switch assembly as such switches are often mounted in a door panel. Partly due to the size of the switch assembly, attachment of the switch assembly to the vehicle was accomplished by fasteners such as screws. Accordingly, it would be desirable to achieve secure fastenerless attachment to a vehicle in a manner which facilitates vehicle assembly.

Seat switches commonly utilize a slide-type switch actuator wherein the contactor actuator is mounted to slide along a rail member. The contactor actuator and rail member are secured in place within the switch housing by the housing cover so that the switch actuators are not operable for testing prior to connection of the housing cover. Such an assembly sequence requires constant reliability checks due to mispositioned contactors, housing and cover warpage and assembly error due to "blind" assembly on the assembly line. These problems can cause intermittent circuits, high millivolts and binding knob controls. Thus, it would be desirable to facilitate assembly and assure proper positioning and securement of the switch actuators prior to mounting the housing cover to allow initial testing and visual inspection thereof.

It is an object of the present invention to provide a new and improved seat switch assembly of significantly reduced profile which overcomes the aforementioned shortcomings.

A further object of the invention is to provide a seat switch assembly which facilitates manufacture and installation with enhanced reliability of operation.

A further object of the invention is to provide a seat switch assembly which achieves fastenerless mounting to a vehicle.

A still further object of the invention is to provide an automotive switch of the slide actuator type which facilitates manufacture and enhances reliability.

A further object of the invention is to provide an automotive switch which affords outline design illumination of the switch.

Other objects will be in part obvious and in part pointed out more in detail hereinafter.

Accordingly, it has been found that the foregoing and related objects are attained and the disadvantages of the prior art are overcome in a seat switch assembly with a housing comprising a front cover, a middle switch plate and a back cover. The switch plate is an insert molded unitary switch plate with a plurality of electrical buses molded therein and an upper support surface with a plurality of contact surfaces. A plurality of switch actuator assemblies are mounted on the support surface. Each switch actuator assembly has a contactor for electrically contacting a respective contact surface, a contactor actuator slidably mounted to a rail member for sliding movement to actuator the contactor and a pair of space support posts extending from the support surface. The rail member and snap lock engagement to secure the rail member to the support posts. The front cover is mounted to the switch plate to enclose the switch actuator assemblies. Switch knobs connected to the contactor actuators are mounted at the exterior wall of the front cover. The exterior wall has a translucent section which defines an outline design such as the outline of an automobile seat about the knobs. An optical fiber is configured in the form of the outline design and is mounted within the switch housing adjacent the translucent section. The opposite ends of the optical fiber terminate at a light source within the switch housing to illuminate the optical fiber and thus the outline design about the knobs. The housing includes fastenerless snap lock mounting tabs for snap lock mounting to a support structure within the vehicle interior.

BRIEF DESCRIPTION OF THE DRAWINGS

FIG. 4 is an enlarged broken away perspective view of a switch actuator assembly.

FIG. 5 is an exploded perspective view of the assembly of FIG. 4.

FIG. 6 is an elevational view partly in section of the actuator assembly of FIG. 4.

DESCRIPTION OF THE PREFERRED EMBODIMENT

Figure 1:
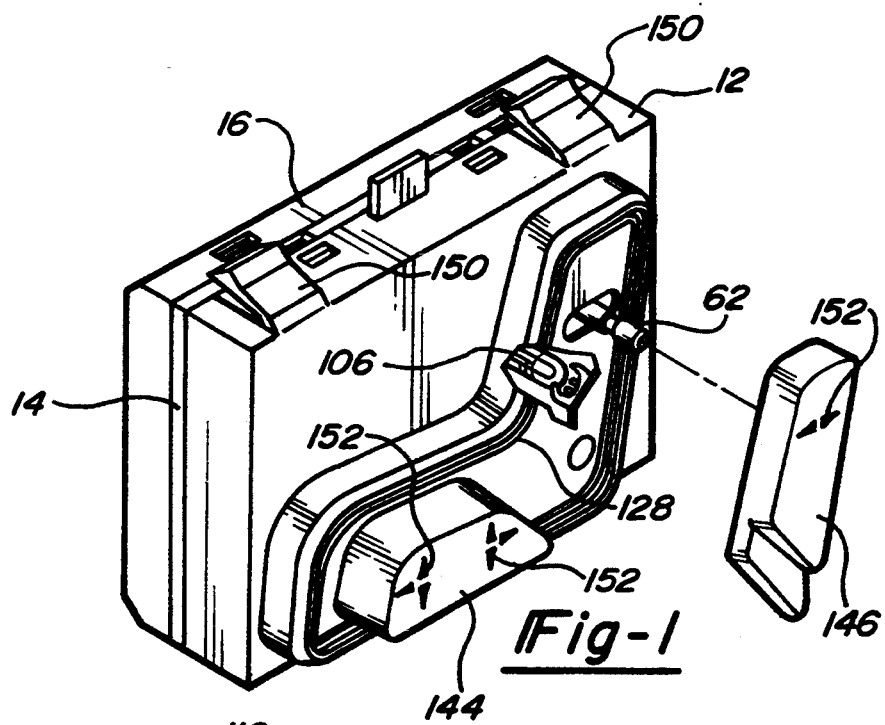
FIG. 1 is a partly broken away perspective view of the seat switch assembly of the present invention.

Although specific forms of the present invention have been selected for illustration in the drawings, and the following description is drawn in specific terms for the purpose of describing these forms of the invention, the description is not intended to limit the scope of the invention which is defined in the appended claims.

Referring to the drawings, a switch housing is generally formed by an interlocking front cover assembly 12, middle switch plate 14 and back cover 16. The switch plate 14 (FIG. 3) is an insert molded unitary plate member with a plurality of bus bars or conductors 18 molded therein. The terminal end of each bus bar has an aperture 20 for connecting the bus bar to a wire assembly (not shown) by a rivet or the like. The wire assembly connects the seat switch to a vehicle wire harness to thereby electrically connect the switch to the seat positioning motors. Insert molding is a known procedure for fabricating bus bars in an electrically insulating plate and need not be described in detail for purposes of the present invention.

The upper surface 22 of the plate 14 mounts three switch actuator assemblies of the type shown in FIG. 4. Referring to FIGS. 4–6, the switch actuator assembly 24 generally comprises a contactor 26, a contactor actuator 28 and a rail member or pin 30. The contactor 26 is mounted to a yoke or bracket 32 for pivotal movement between a closed position wherein one end 34 engages the contact point or surface 36 on upper surface 22 to make an electrical connection and an open position wherein the end 34 is disengaged from the contact surface 36 and the other end 38 of contactor 26 engages the stop 40. The contactor 26 is formed of electrically conducting material such as copper as is the support bracket 32. The support bracket 32 and the contact surface 36 are insert molded in plate 14. The support bracket 32 is electrically connected to one of the bus bars 18 to connect the bus bar to the contactor. The contact surface 36 is electrically connected to another bus bar 18 such as a common ground bus bar so that when the contactor 26 is in a closed position, the bus bar connected to bracket 32 is electrically connected to ground to complete a circuit and provide power to one of the seat motors.

The contactor actuator 28 is slidably mounted to the rail or pin 30 for sliding movement to actuate the contactor 26 between the open and closed positions. The pin 30 has a cylindrical shank 42 and a flat annular head 44. The contactor actuator 28 has a through bore 46 to receive the shank 42 for sliding movement of the actuator 28 along the pin 30. The actuator 28 includes a plunger 48 spring biased against the contactor 26 by the coil spring 50. As the actuator 28 is moved from left to right as viewed in FIG. 6, the contactor 26 will be pivoted clockwise from the closed position (as shown) to an open position (whereby the end 34 is raised from and electrically disconnected from contact surface 36). A stop 52, bracket 54 and contact surface 56 are positioned adjacent contact surface 36, bracket 32 and stop 40, respectively for a second contactor (not shown). The second contactor is mounted to bracket 54 and engaged by a second plunger 58 of actuator 28. Thus, movement of the contact actuator 28 to the right (as viewed in FIG. 6) will close the circuit between contact point 56 and bracket 54 and open the circuit between contact surface 36 and bracket 32 while movement thereafter to the left will reclose the circuit between contact point 36 and bracket 32 and open the circuit between contact point 56 and bracket 54. The contactor 28 also has a pair of apertures 60 to receive knob with stem 62 to connect the actuator to a knob for manually sliding the contactor actuator.

Pin 30 is mounted to a pair of integrally molded support posts 64, 66 which extend upwardly from the support surface 22. The posts 64, 66 and pin 30 are configured for interlocking engagement to secure the pin to the posts. In this regard, the post 66 has an aperture 68 to receive the cylindrical end of the pin 30. The post 64 has opposing wall sections 70, 72 forming a slot 74 therebetween to receive the head 44 of pin 30. The wall section 72 has a recess 76 to receive and support the shank 42 of pin 30 in alignment with the aperture 68 of post 66. The wall section 70 has a with tab 77 at its upper end which extends over the slot 74 to engage and trap the head 44 in slot 74. The wall section 70 is slightly yieldable to allow insertion of the head 44 past with tab 77 into slot 74 to provide a snap lock interconnection. The snap lock mounting of pins 30 to support posts 68, 70 provides easy and efficient assembly and allows the mechanical operation of the actuator 28 and contactor 26 to be tested and visually inspected prior to enclosing the switch with the cover 12. Other types of interlocking engagement between the pin and support posts may also be utilized.

Figure 3:
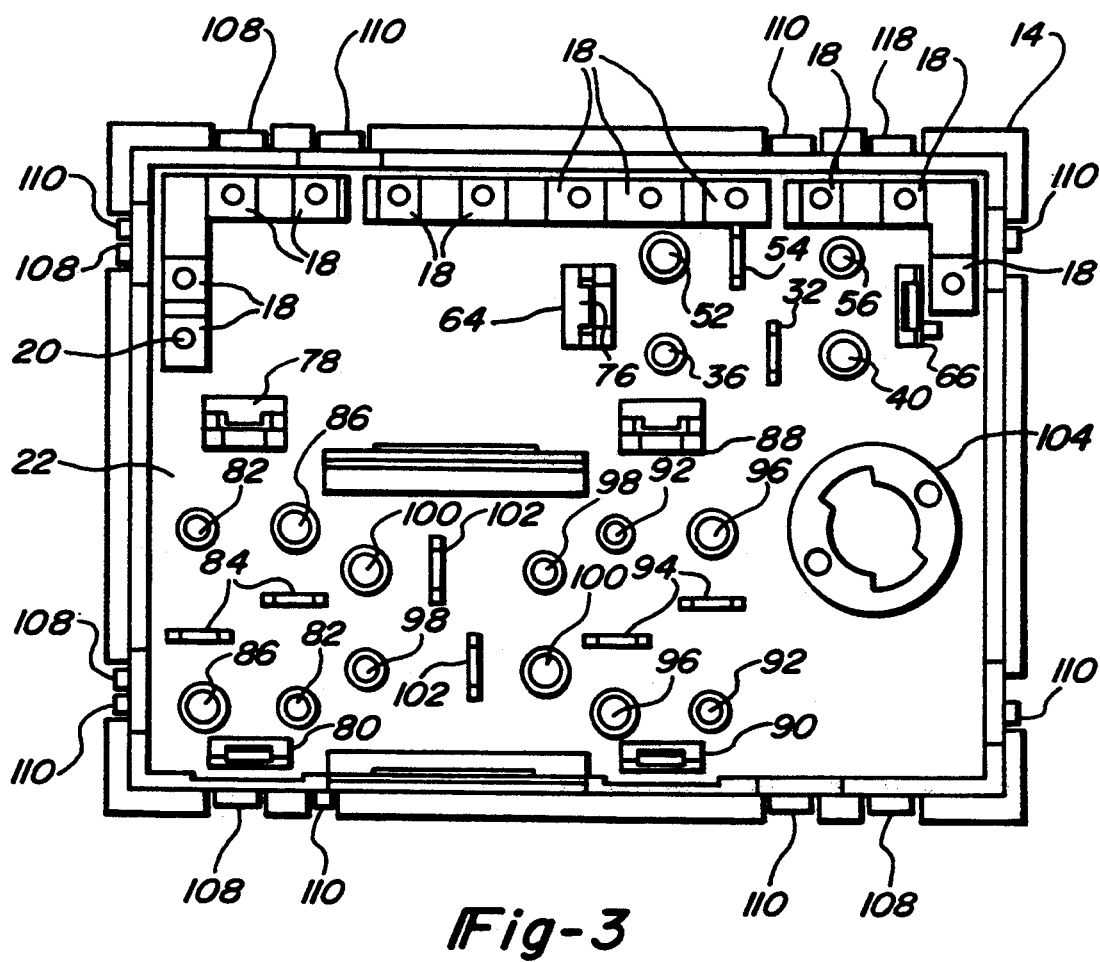
FIG. 3 is a plan view of the switch plate.

Referring to FIG. 3, the support surface 22 of plate 14 has additional pairs of integrally molded support posts identical to support posts 64, 66 which mount similar actuator assemblies. Specifically, support posts 78, 80, contact surfaces 82, brackets 84 and stops 86 mount a second actuator assembly (not shown). Similarly, a third actuator assembly (also not shown) is mounted to support posts 88, 90 and associated contact surfaces 92, brackets 94 and stops 96. The support surface 22 also contains contact surfaces 98, stops 100 and brackets 102 for an actuator assembly which does not utilize a rail member and need not be described in detail for purposes of the present invention.

Support surface 22 also has a bulb socket 104 for mounting with "bulb 106 (as shown better in FIG. 1)". The outer wall of switch plate 14 has molded tabs 108 configured for snap lock mounting of back cover 16 and molded tabs 110 configured for snap lock mounting of the front cover assembly 12.

Figure 2:
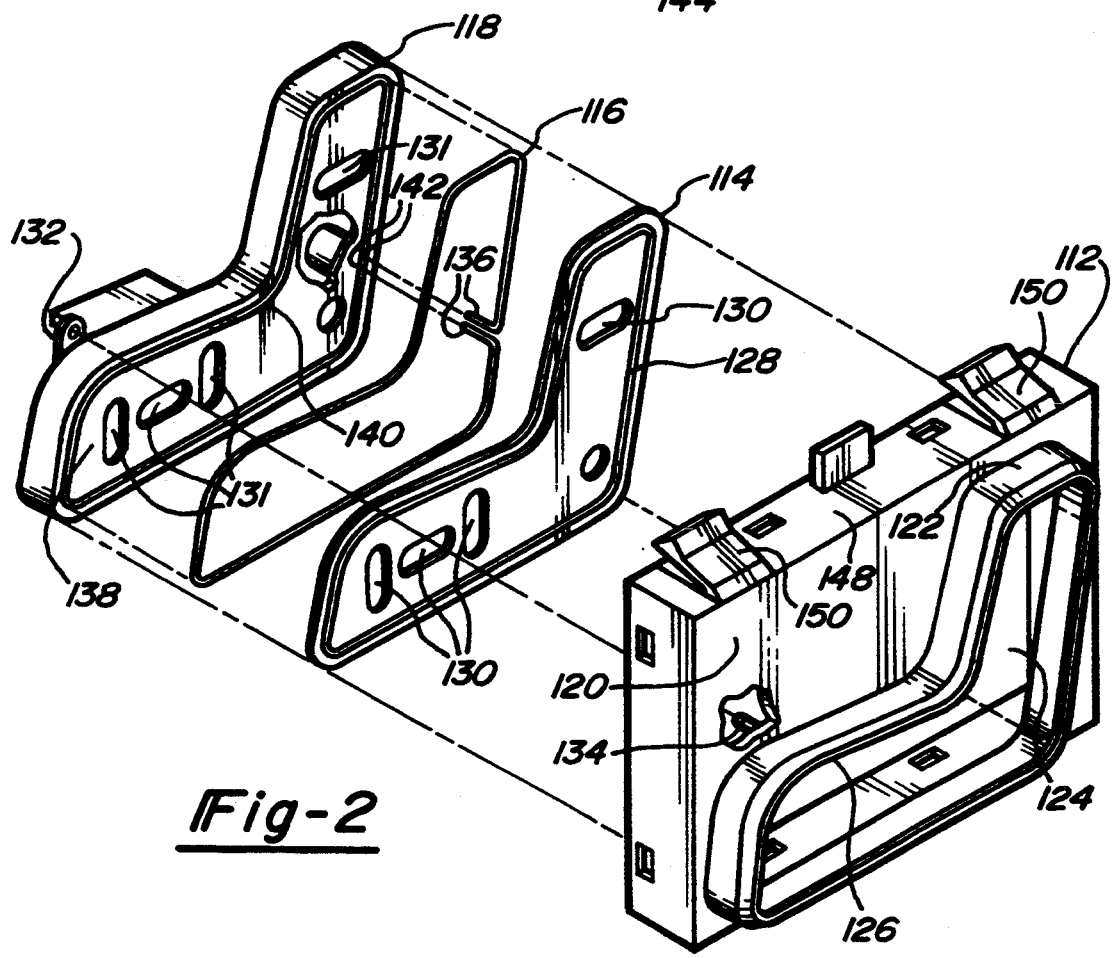
FIG. 2 is an exploded perspective view of the front cover of the switch assembly of FIG. 1.

Referring to FIGS. 1 and 2, the front cover assembly 12 has a cover 112, an applique plate 114, a fiber optic strand 116 and a back-up plate 118. The cover 112 has a planar front wall 120 with a boss 122 in the shape of an automobile seat defining an opening 124 in the front wall 120. The applique plate 114 is formed in the shape of the automobile seat design to mount within the boss 122 against an inwardly projecting lip 126. The applique plate 114 is opaque with a translucent band or strip 128 extending about the inner circumference of the applique plate 114 so as to define the outline design of an automobile seat. The band 128 is positioned inwardly of the outside edge of the plate 114 so as to be inward of the boss 122 and thereby visible at the front cover 112. Preferably, the translucent band 128 is colored. The applique plate 114 has switch stem apertures 130.

The back-up plate 118 is also formed in the design of an automobile seat so as to mount snugly within the boss 122 and retain the applique plate 114 against the lip 126. The back-up plate 118 has three mounting tabs 132 (only one of which is shown) with apertures to receive the mounting stubs 134 of cover 112 to secure the back-up plate 118 within the boss 122. The back-up plate 118 also has switch stem apertures 131.

The fiber optic strand 116 is formed in the shape of the translucent band 128 and has terminal ends 136. The outer wall 138 of back-up plate 118 has a circumferential recess or groove 140 formed in the shape of the optic strand 116 to receive the optic strand and support it in a position directly adjoining the translucent band 128. The terminal ends 136 of optic strand 116 extend through apertures 142 in the recess 140 so that the terminal ends are positioned adjoining the bulb 106. In assembly, the back-up plate 118 is secured within the boss 122 to retain the applique 114 against the retaining lip 126. The fiber optic strand 116 is aligned with the translucent band 128 so that light through the fiber optic strand illuminates the translucent band 128 to provide an illuminated seat design about the seat knobs 144, 146 for easy identification of the seat switch assembly.

The top wall 148 of cover 112 has a pair of integrally molded snap lock tabs 150 for fastenerless snap lock mounting of the seat switch assembly in a corresponding support structure in the vehicle interior. Another pair of snap lock tabs 150 (not shown) are positioned on the bottom wall of the cover 112.

The knobs 144, 146 are connected to the contactor actuators 28 by respective stems 62. Directional indicia in the form of arrowheads 152 indicate the respective directions of movement of the knobs.

As can be seen, an automotive seat switch has been described which facilitates manufacture and installation with enhanced reliability of operation. The interlocking of the rail members to the support posts prior to attaching the front cover allows the switch actuator assembly to be checked for mispositioned contactors, misalignment, proper securement, etc. and affords ease of assembly. Further, the seat switch provides outline design illumination of the switch and fastenerless mounting to a vehicle. Dimensionally, the seat switch provides a significantly reduced profile relative to the prior art due in part to the insert molded character of the switch plate 14. Overall, the described seat switch accomplishes all of its stated objectives.

As will be apparent to persons skilled in the art, various modifications and adaptations of the structure above described will become readily apparent without departure from the spirit and scope of the invention, the scope of which is defined in the appended claims.

What is claimed is:

1. An automobile seat switch assembly for controlling seat movement comprising:
   a switch housing comprising a front cover, a middle switch plate, and a back cover, said switch plate being an insert molded, unitary switch plate with a plurality of electrical conductors molded therein and having an outer support surface with a plurality of conductor contact surfaces,
   a plurality of switch actuator assemblies, each said switch actuator assembly comprising
       a contactor for electrically contacting a respective said contact surface,
       a contactor actuator slidably mounted to a rail member for sliding movement to actuate said contactor, and
       a pair of spaced support posts extending from said housing, said rail member being mounted to said support posts, wherein said rail member and said support posts are configured for snap lock engagement, and said front cover enclosing said switch actuator assemblies.

2. The device of claim 1 comprising:
   switch knobs connected to said contactor actuators for manual actuation,
   said front cover having an exterior wall and said knobs being mounted adjacent said exterior wall
   said exterior wall having a translucent band section defining a predetermined outline design about said knobs,
   a light source,
   an optical fiber configured to correspond to said predetermined outline design and mounted within said housing substantially adjoining said translucent section, said optical fiber having opposite ends with at least one end being positioned adjacent said light source to illuminate said optical fiber,
   said rail member and said support posts being configured for snap lock interlocking engagement to secure said rail member to said support posts, and means for snap lock mounting said housing to an automobile interior support structure.

3. The device of claim 2 wherein said housing has an optical fiber mounting surface with a groove configured to receive and mount said optical fiber, said groove being configured to correspond to said predetermined outline design.

4. The device of claim 3 wherein said light source comprises a lamp mounted within said housing adjacent said opposite ends of said optical fiber.

5. The device of claim 1 wherein
   said rail member comprises a cylindrical pin having first and second opposite ends with a head portion at said first end, and
   said pair of support posts comprises a first and second support post with said first support post being configured for snap lock engagement with said head portion of said pin.

6. The device of claim 5 wherein said first support post has a slot to receive the head portion of said pin and a tab to snap lock said head portion in said slot.

7. The device of claim 6 wherein said second support post has an aperture to receive said second end of said pin.

8. An automotive switch assembly comprising:
   a switch housing having a support surface,
   at least one conductor contact surface on said support surface,
   a contactor for electrically contacting said contact surface,
   a contactor actuator slidably mounted to a rail member for sliding movement to actuate said contactor,
   a pair of spaced support posts extending from said housing, and
   said rail member and said support posts being configured for snap lock interlocking engagement to secure said rail member to said support posts.

9. The device of claim 8 wherein:
   said rail member comprises a cylindrical pin having first and second opposite ends with a head portion at said first end, and
   said pair of support posts comprises first and second support posts with said first support post being configured for snap lock engagement with said head portion of said pin.

10. The device of claim 9 wherein said first support post has a slot to receive the head portion of said pin and a tab to snap lock said head portion in said slot.

11. The device of claim 10 wherein said second support post has an aperture to receive said second end of said pin.

12. An automotive switch assembly comprising:
    a switch housing having a support surface, wherein said switch housing comprises a cover for enclosing said support surface
    at least one conductor contact surface on said support surface, a contactor for electrically contacting said contact surface, a contactor actuator slidably mounted to a rail ember for sliding movement to actuate said contactor, a pair of spaced support posts extending from said housing, and said rail member and said support posts being configured for interlocking engagement to secure said rail member to said support posts, said cover being configured to be connectable to said support surface subsequent to said rail member being secured to said support posts.

13. An automotive switch assembly comprising:

a switch housing having an exterior wall, a manual switch actuator member mounted adjacent said exterior wall, said exterior wall having a translucent section defining a predetermined outline design about said manual actuator member, a light source, and an optical fiber mounted within said housing adjacent said translucent section, said optical fiber having opposite ends with at least one end being positioned adjacent said light source to illuminate said optical fiber, wherein said housing has an optical fiber mounting surface with a groove configured to receive and mount said optical fiber, said groove being configured to correspond to said predetermined outline design.

14. The device of claim 13 wherein said translucent section is a translucent band configured in said predetermined outline design encircled about said manual actuator member, and wherein said optical fiber is configured substantially in said predetermined outline design and is mounted substantially parallel and adjoining said band.

15. The device of claim 14 wherein said light source comprises a lamp mounted within said housing adjacent said opposite ends of said optical fiber.

* * * * *

UNITED STATES PATENT AND TRADEMARK OFFICE
CERTIFICATE OF CORRECTION

PATENT NO. : 5,384,440
DATED : Jan. 24, 1995
INVENTOR(S) : Joseph Wnuk et al

It is certified that error appears in the above-indentified patent and that said Letters Patent is hereby corrected as shown below:

On the title page item [57], line 11, "a pari of" should be --a pair of--.

Column 2, line 29: after "and" insert --the support posts are configured for interlocking--.

Column 3, line 61: delete "with".

Column 4, line 9: delete "with".

Column 4, line 32: "mounting with "bulb 106 (as shown better in FIG. 1)"." should be --mounting bulb 106 (as shown better in FIG. 1).--

Column 6, line 26: delete "a".

Column 6, line 27: "support post with" should be --support posts with--.

Column 7, line 3: "rail ember" should be --rail member--.

Signed and Sealed this

Sixteenth Day of May, 1995

*Attest:*

BRUCE LEHMAN

*Attesting Officer*   *Commissioner of Patents and Trademarks*